(12) United States Patent
Cote

(10) Patent No.: US 9,132,390 B2
(45) Date of Patent: Sep. 15, 2015

(54) NON-BRAIDED REINFORCED HOLOW FIBRE MEMBRANE

(75) Inventor: Pierre Lucien Cote, Ontario, CA (US)

(73) Assignee: BL Technologies Inc., Trevose, PA (US)

( * ) Notice: Subject to any disclaimer, the term of this patent is extended or adjusted under 35 U.S.C. 154(b) by 808 days.

(21) Appl. No.: 13/260,443

(22) PCT Filed: Mar. 26, 2010

(86) PCT No.: PCT/CA2010/000469
§ 371 (c)(1),
(2), (4) Date: Sep. 26, 2011

(87) PCT Pub. No.: WO2010/108285
PCT Pub. Date: Sep. 30, 2010

(65) Prior Publication Data
US 2012/0018371 A1    Jan. 26, 2012

Related U.S. Application Data

(60) Provisional application No. 61/163,654, filed on Mar. 26, 2009.

(51) Int. Cl.
*B01D 39/00* (2006.01)
*B01D 39/14* (2006.01)
(Continued)

(52) U.S. Cl.
CPC ............... *B01D 69/08* (2013.01); *B01D 69/02* (2013.01); *B01D 69/085* (2013.01); *B01D 2325/40* (2013.01); *Y10T 29/49826* (2015.01)

(58) Field of Classification Search
CPC ........ B01D 39/00; B01D 69/02; B01D 69/08; B01D 69/085; B01D 69/105; B01D 2325/40; D01D 5/24

USPC ......... 210/500.23, 490; 442/60, 269, 366, 43, 442/58, 364; 29/428; 427/407.1
See application file for complete search history.

(56) References Cited

U.S. PATENT DOCUMENTS

| | | | |
|---|---|---|---|
| 2,936,482 | A | 5/1960 | Kilian |
| 3,494,121 | A | 2/1970 | Bohrer |

(Continued)

FOREIGN PATENT DOCUMENTS

| | | |
|---|---|---|
| CA | 986422 | 3/1976 |
| CA | 2288316 | 5/2000 |

(Continued)

OTHER PUBLICATIONS

Caplan et al., Formation of microporous Teflon PFA membranes via thermally induced phase separation, Journal of Membrane Science, 130 (1997) p. 219-237.

(Continued)

*Primary Examiner* — Ana Fortuna
(74) *Attorney, Agent, or Firm* — GE Global Patent Operation

(57) ABSTRACT

A hollow fiber membrane comprising a reinforcing structure embedded within a membrane wall is provided. A generally tube-shaped reinforcing structure for a hollow fiber membrane is also provided. The reinforcing structure comprises i) a plurality of warp filaments, the plurality of warp filaments being generally parallel to each other and spaced apart from each other circumferentially; and, ii) one or more wrap filaments, each of the one or more wrap filaments extending obliquely between at least two of the plurality of warp filaments.

12 Claims, 7 Drawing Sheets

(51) Int. Cl.
  *B32B 5/08* (2006.01)
  *B32B 5/02* (2006.01)
  *D04H 1/74* (2006.01)
  *B32B 5/12* (2006.01)
  *B01D 69/08* (2006.01)
  *B01D 69/02* (2006.01)

(56) References Cited

U.S. PATENT DOCUMENTS

| | | | |
|---|---|---|---|
| 3,557,952 A * | 1/1971 | Heikinheimo | 209/521 |
| 3,567,666 A | 3/1971 | Berger | |
| 3,615,024 A | 10/1971 | Michaels | |
| 3,676,193 A | 7/1972 | Cooper et al. | |
| 3,705,070 A * | 12/1972 | Kim | 428/112 |
| 3,745,142 A | 7/1973 | Mahlman | |
| 3,816,231 A * | 6/1974 | Marshall | 442/366 |
| 3,849,241 A | 11/1974 | Butin et al. | |
| 3,948,781 A | 4/1976 | Brun et al. | |
| 3,984,328 A | 10/1976 | Brun et al. | |
| 4,020,230 A | 4/1977 | Mahoney et al. | |
| 4,061,821 A | 12/1977 | Hayano et al. | |
| 4,115,492 A | 9/1978 | Mahoney et al. | |
| 4,247,498 A | 1/1981 | Castro | |
| 4,253,936 A | 3/1981 | Leysen et al. | |
| 4,299,083 A | 11/1981 | Igel et al. | |
| 4,335,193 A | 6/1982 | Doi et al. | |
| 4,340,480 A | 7/1982 | Pall et al. | |
| 4,368,124 A * | 1/1983 | Brumfield | 210/321.79 |
| 4,384,047 A | 5/1983 | Benzinger et al. | |
| 4,399,035 A | 8/1983 | Nohmi et al. | |
| 4,405,688 A | 9/1983 | Lowery et al. | |
| 4,406,850 A | 9/1983 | Hills | |
| 4,541,981 A | 9/1985 | Lowery et al. | |
| 4,664,681 A | 5/1987 | Anazawa et al. | |
| 4,666,607 A | 5/1987 | Josefiak et al. | |
| 4,702,836 A | 10/1987 | Mutoh et al. | |
| 4,707,265 A | 11/1987 | Barnes, Jr. et al. | |
| 4,741,829 A | 5/1988 | Takemura et al. | |
| 4,764,320 A | 8/1988 | Chan et al. | |
| 4,919,856 A | 4/1990 | Anazawa et al. | |
| 4,957,943 A | 9/1990 | McAllister et al. | |
| 5,011,588 A | 4/1991 | Rao et al. | |
| 5,013,339 A | 5/1991 | Mahoney et al. | |
| 5,022,990 A | 6/1991 | Doi et al. | |
| 5,066,401 A | 11/1991 | Muller et al. | |
| 5,139,529 A | 8/1992 | Seita et al. | |
| 5,151,191 A | 9/1992 | Sunaoka et al. | |
| 5,171,493 A | 12/1992 | Aptel et al. | |
| 5,209,852 A | 5/1993 | Sunaoka et al. | |
| 5,232,597 A | 8/1993 | Eguchi | |
| 5,232,642 A | 8/1993 | Kamo et al. | |
| 5,238,562 A | 8/1993 | Rogut | |
| 5,240,610 A | 8/1993 | Tani et al. | |
| 5,271,883 A | 12/1993 | Timmons et al. | |
| 5,284,583 A | 2/1994 | Rogut | |
| 5,294,338 A | 3/1994 | Kamo et al. | |
| 5,303,550 A | 4/1994 | Setzer | |
| 5,328,610 A | 7/1994 | Rogut | |
| 5,332,498 A | 7/1994 | Rogut | |
| 5,336,298 A | 8/1994 | Quinn et al. | |
| 5,374,453 A | 12/1994 | Swei et al. | |
| 5,376,273 A | 12/1994 | Pacheco et al. | |
| 5,385,777 A | 1/1995 | Higuchi et al. | |
| 5,392,588 A | 2/1995 | Morrison | |
| 5,435,955 A | 7/1995 | Kamei et al. | |
| 5,470,659 A | 11/1995 | Baumgart et al. | |
| 5,472,607 A | 12/1995 | Mailvaganam et al. | |
| 5,474,680 A | 12/1995 | Eguchi | |
| 5,489,406 A | 2/1996 | Beck et al. | |
| 5,497,608 A | 3/1996 | Matsumoto et al. | |
| 5,547,756 A | 8/1996 | Kamo et al. | |
| 5,637,385 A | 6/1997 | Mizuki et al. | |
| 5,656,167 A | 8/1997 | Martz | |
| 5,709,735 A | 1/1998 | Midkiff et al. | |
| 5,716,689 A | 2/1998 | Rogut | |
| 5,753,351 A | 5/1998 | Yoshida et al. | |
| 5,782,959 A | 7/1998 | Yang et al. | |
| 5,783,608 A | 7/1998 | Sugo et al. | |
| 5,804,128 A | 9/1998 | Ogata et al. | |
| 5,882,461 A | 3/1999 | Rogut | |
| 5,888,605 A | 3/1999 | Hachisuka et al. | |
| 5,891,191 A * | 4/1999 | Stinson | 623/1.2 |
| 5,914,039 A | 6/1999 | Mahendran et al. | |
| 5,972,501 A | 10/1999 | Ohmory et al. | |
| 6,015,495 A | 1/2000 | Koo et al. | |
| 6,024,872 A | 2/2000 | Mahendran et al. | |
| 6,048,641 A | 4/2000 | Ohmory et al. | |
| 6,077,376 A | 6/2000 | Katraro et al. | |
| 6,083,393 A | 7/2000 | Wu et al. | |
| 6,090,731 A | 7/2000 | Pike et al. | |
| 6,114,017 A | 9/2000 | Fabbricante et al. | |
| 6,127,433 A | 10/2000 | Sugo et al. | |
| 6,183,640 B1 | 2/2001 | Wang | |
| 6,245,239 B1 | 6/2001 | Cote et al. | |
| 6,264,044 B1 | 7/2001 | Meyering et al. | |
| 6,273,271 B1 | 8/2001 | Moya | |
| 6,280,791 B1 | 8/2001 | Meyering et al. | |
| 6,354,443 B1 | 3/2002 | Moya | |
| 6,354,444 B1 | 3/2002 | Mahendran et al. | |
| 6,454,943 B1 | 9/2002 | Koenhen | |
| 6,465,094 B1 | 10/2002 | Dugan | |
| 6,495,663 B1 | 12/2002 | Rothbard et al. | |
| 6,559,192 B2 | 5/2003 | Maccone et al. | |
| 6,635,204 B2 | 10/2003 | Tanaka et al. | |
| 6,746,627 B2 | 6/2004 | Niu et al. | |
| 6,792,744 B2 | 9/2004 | Feuerlohn et al. | |
| 6,802,971 B2 | 10/2004 | Gorsuch et al. | |
| 6,890,435 B2 | 5/2005 | Ji et al. | |
| RE39,176 E * | 7/2006 | Dutt | 442/43 |
| 7,081,273 B2 | 7/2006 | Ji | |
| 7,165,682 B1 | 1/2007 | Ji | |
| 7,172,075 B1 | 2/2007 | Ji | |
| 7,247,238 B2 | 7/2007 | Mullette et al. | |
| 7,267,872 B2 | 9/2007 | Lee et al. | |
| 7,306,105 B2 | 12/2007 | Shinada et al. | |
| 8,393,479 B2 | 3/2013 | Kamleiter et al. | |
| 8,999,454 B2 * | 4/2015 | Pedersen et al. | 427/407.1 |
| 2002/0046970 A1 | 4/2002 | Murase et al. | |
| 2002/0090690 A1 | 7/2002 | Eddleman et al. | |
| 2002/0155289 A1 | 10/2002 | Cistone et al. | |
| 2003/0094409 A1 | 5/2003 | Minegishi et al. | |
| 2003/0107150 A1 | 6/2003 | Hamanaka et al. | |
| 2003/0192826 A1 | 10/2003 | Wang et al. | |
| 2004/0078903 A1 | 4/2004 | Bruning et al. | |
| 2004/0136894 A1 | 7/2004 | Yoshizawa et al. | |
| 2005/0124249 A1 | 6/2005 | Uribarri | |
| 2005/0205488 A1 | 9/2005 | Shinada et al. | |
| 2006/0175243 A1 | 8/2006 | Mahendran et al. | |
| 2007/0262017 A1 | 11/2007 | Shinada et al. | |
| 2008/0045109 A1 * | 2/2008 | Ogata et al. | 442/364 |
| 2008/0210623 A1 | 9/2008 | McMahon et al. | |
| 2008/0241451 A1 | 10/2008 | Beckers et al. | |
| 2010/0193428 A1 * | 8/2010 | Hane et al. | 210/489 |
| 2012/0097604 A1 * | 4/2012 | Cote et al. | 210/500.23 |

FOREIGN PATENT DOCUMENTS

| | | |
|---|---|---|
| CA | 2474625 | 8/2003 |
| CA | 2478445 | 9/2003 |
| CA | 2478831 | 9/2003 |
| CA | 2630418 | 6/2007 |
| EP | 160483 | 11/1985 |
| EP | 0241995 | 10/1987 |
| EP | 0819467 | 1/1998 |
| EP | 0998972 | 5/2000 |
| EP | 1193292 | 4/2002 |
| EP | 1236503 | 9/2002 |
| EP | 1658889 | 5/2006 |
| GB | 1374704 | 11/1974 |
| GB | 2041821 | 9/1980 |
| JP | 53-039982 | 9/1974 |
| JP | 52137026 | 11/1977 |
| JP | 53028084 | 3/1978 |

(56) References Cited

FOREIGN PATENT DOCUMENTS

| | | |
|---|---|---|
| JP | 55137209 | 10/1980 |
| JP | 57005914 | 1/1982 |
| JP | 57-028139 | 2/1982 |
| JP | 58-004810 | 1/1983 |
| JP | 58-049408 | 3/1983 |
| JP | 58-093734 | 6/1983 |
| JP | 59196706 | 11/1984 |
| JP | 60137402 | 7/1985 |
| JP | 60139815 | 7/1985 |
| JP | 61-146811 | 7/1986 |
| JP | 62001404 | 1/1987 |
| JP | 62019206 | 1/1987 |
| JP | 62045318 | 2/1987 |
| JP | 62079806 | 4/1987 |
| JP | 62-133190 | 6/1987 |
| JP | 64-014315 | 1/1989 |
| JP | 2107318 | 4/1990 |
| JP | 2268816 | 11/1990 |
| JP | 04-265132 | 9/1992 |
| JP | 4265133 | 9/1992 |
| JP | 4293529 | 10/1992 |
| JP | 5301031 | 11/1993 |
| JP | 06-015152 | 1/1994 |
| JP | 06-246139 | 9/1994 |
| JP | 6246140 | 9/1994 |
| JP | 07-080263 | 3/1995 |
| JP | 07-116483 | 5/1995 |
| JP | 7157580 | 6/1995 |
| JP | 8165396 | 6/1996 |
| JP | 52082682 | 7/1997 |
| JP | 10-323546 | 12/1998 |
| JP | 11-319519 | 11/1999 |
| JP | 2000-093768 | 4/2000 |
| JP | 2000288365 | 10/2000 |
| JP | 2008-114180 | 5/2008 |
| NL | 1010458 C2 | 4/2000 |
| WO | WO 93/23153 | 11/1993 |
| WO | WO 99/01207 | 1/1999 |
| WO | WO 00/78437 | 12/2000 |
| WO | WO 02/34373 | 5/2002 |
| WO | WO 03/059496 | 7/2003 |
| WO | WO 03/068374 | 8/2003 |
| WO | WO 03/076055 | 9/2003 |
| WO | WO 03/076056 | 9/2003 |
| WO | WO 03/097221 | 11/2003 |
| WO | WO 2004/009221 | 1/2004 |
| WO | WO 2004/089520 | 10/2004 |
| WO | WO 2005/002712 | 1/2005 |
| WO | 2005061081 A1 | 7/2005 |
| WO | WO 2006053406 | 5/2006 |
| WO | WO 2006063426 | 6/2006 |
| WO | 2007116072 | 10/2007 |
| WO | WO 2007116072 | 10/2007 |
| WO | 2008066340 | 6/2008 |
| WO | WO2008/066340 A1 * | 6/2008 |
| WO | WO 2008066340 | 6/2008 |
| WO | WO 2010/081228 | 7/2010 |
| WO | WO 2010/108285 | 9/2010 |
| WO | WO 2010/148517 | 12/2010 |

OTHER PUBLICATIONS

Choi et al., Fabrication and characterization of multi-walled carbon nanotubes/polymer blend membranes, Journal of Membrane Science 284 (2006) p. 406-415.
Choi et al., Modification of Performances of Various Memranes Using MWNTs as a Modifier, Macromol. Symp. 2007, 249-250, p. 610-617.
Lin et al., Microporous PVDF membrane formation by immersion precipitation from water/TEP/PVDF system, Desalination, 145 (2002) p. 25-29.
Lloyd et al., Microporous membrane formation via thermally-induced phase separation. II. Liquid-liquid phase separation, Journal of Membrane Science, 64 (1991) p. 1-11.
Lloyd, Douglas R., Microporous membrane formation via thermally induced phase separation. I. Solid-liquid phase separation, Journal of Membrane Science, 52 (1990) p. 239-261.
PCT Search Report dated Jun. 14, 2010 issued in connection with PCT Application No. PCT/CA2010/000469 which was filed on Mar. 26, 2010.
Ramaswamy, Senthilkumar: Fabrication of poly (ECTFE) membranes via thermally induced phased separation, Journal of Membrane Science 210 (2002) 175-180.
Search Report and Written Opinion from corresponding EP Application No. 10755375.2-1356 dated Jul. 18, 2013.

* cited by examiner

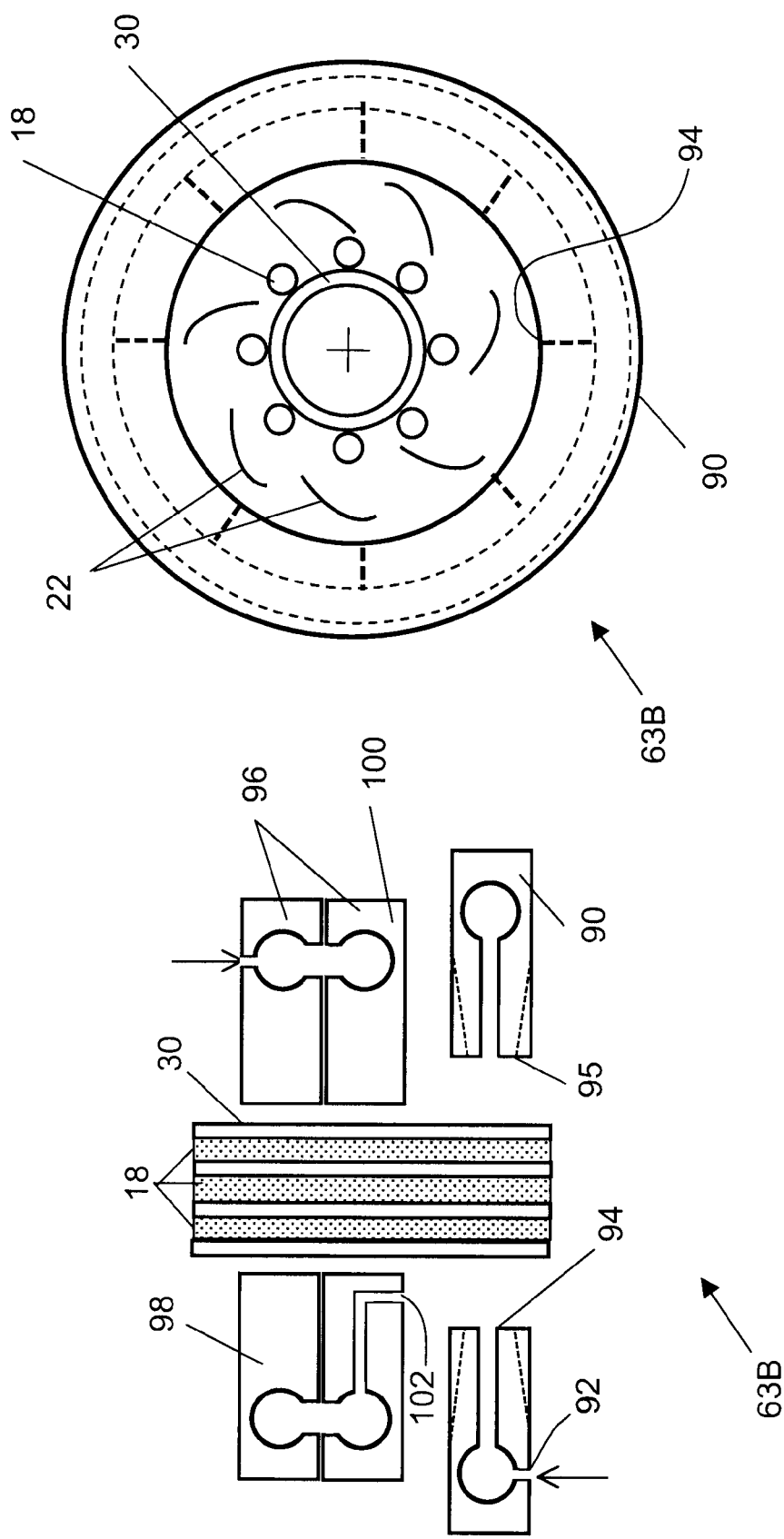

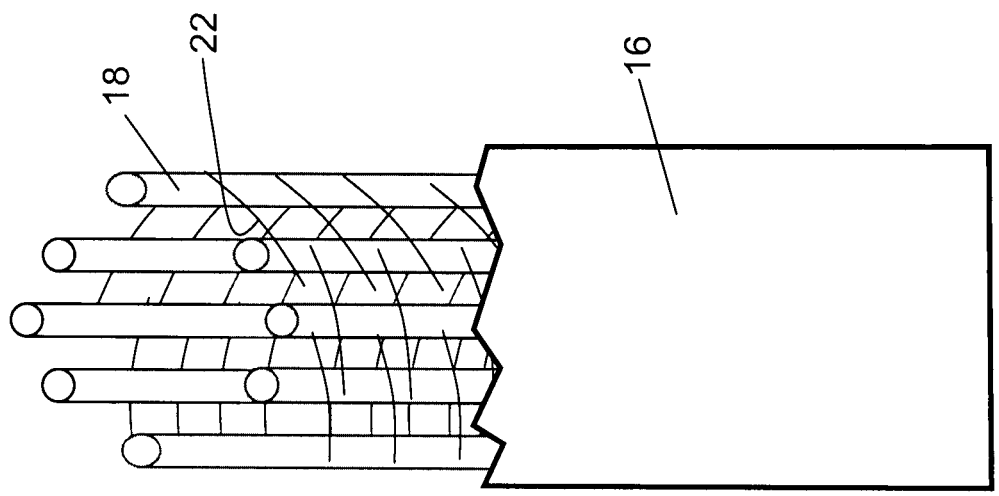
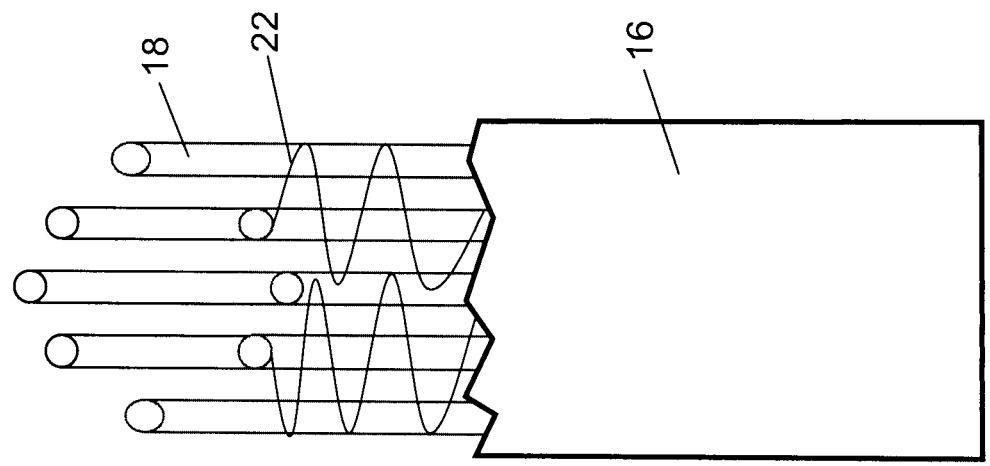

NON-BRAIDED REINFORCED HOLOW FIBRE MEMBRANE

CROSS-REFERENCE TO RELATED APPLICATIONS

For the United States of America, this is a national stage application under 35 U.S.C. §371(c) of prior-filed, co-pending PCT patent application serial number PCT/CA2010/000469, filed on Mar. 26, 2010, which claims the benefit under 35 USC §119(e) of U.S. Provisional Application No. 61/163,654 filed on Mar. 26, 2009, each of which is incorporated herein in its entirety by this reference.

BACKGROUND OF THE INVENTION

1. Field of the Invention

This specification relates to reinforced hollow fiber membranes, to reinforcement structures for hollow fiber membranes, and to methods of making hollow fiber membranes and reinforcement structures for them.

2. Description of the Related Art

The following is not an admission that anything discussed below is citable as prior art or part of the common general knowledge.

Polymeric separation membranes in the form of small capillary tubes or hollow fibres can be made from a variety of polymers by different methods that can be categorized as NIPS (non-solvent induced phase separation), or TIPS (thermally induced phase separation). The membranes may have a separation layer on the outside and may be used, for example, for microfiltration (MF) or ultrafiltration (UF).

The simplest approach is to make the hollow fiber from a single material that provides mechanical properties (tensile resistance, burst or collapse resistance, and resistance to fatigue by cracking), separation properties (rejection and permeability) and chemical properties (tolerance to chemicals in the feed or to cleaners). In many instances where it is not possible to find the right compromise, composite membranes are prepared. In a composite membrane a microporous support structure is coated with the separation layer.

A special case of composite hollow fibre membrane is that where a hollow textile braided sleeve is coated or impregnated with a polymeric membrane. The braid provides the strength and flexibility that is needed in MF/UF applications such as filtration of water suspensions where continuous or intermittent agitation (with air or otherwise) of the hollow fibers is needed to prevent fouling or accumulation of solids on the membrane surface.

There are several examples of braid-supported filtration membranes in the prior art. These include, U.S. Pat. No. 4,061,861 to Hayano et al. where a polymer is impregnated into a hollow braid to prevent shrinkage when operating at high temperature; U.S. Pat. No. 5,472,607 and U.S. Pat. No. 6,354,444 to Mahendran et al.; U.S. Pat. No. 7,267,872 to Lee et al. where the membrane is coated on the outside surface of the braid and penetration is limited; and, U.S. Pat. No. 7,306,105 to Shinada et al. where the braid is coated with 2 different porous layers.

Braid-supported hollow fibre membranes are normally prepared as follows. The braid is fabricated on a braider, wound on a bobbin, and transferred to a spin line where it is coated or impregnated with a polymer solution. Relatively thick wall braids are used in order for the final hollow fibre membrane to be round in shape. This is necessary because the braid must be round-stable, i.e., prevented from flattening out through winding and unwinding and must be round when inserted in the coating spinneret.

Round-stable braids are thus normally made with a thick wall and have two major disadvantages. First, the ratio of inside-to-outside diameters is small, typically smaller than 0.6. The ratio of inside-to-outside diameters is the normalized parameter that determines the pressure loss to conduct permeate through the lumen of the membrane. The high lumen pressure drop in thick wall braids thus limits the length of hollow fibres that can be potted in a module. Second, round-stable braids are fabricated with a large number of braiding carriers. Each carrier is supplied from a different bobbin and the bobbins must cross paths in the braiding machine. The bobbins must start from a stop position, accelerate and decelerate and come back to a stop position every time the carriers cross each other. This is a very slow operation. Small diameter braids (less than 2 mm) are normally made at a speed of less than 0.5 m/min. In contrast, the braid coating/impregnation operation is typically done much faster, at a speed of greater than 15 m/min.

BRIEF SUMMARY OF THE INVENTION

The following is intended to introduce the reader to the detailed description to follow and not to limit or define the claims.

A reinforcing structure for a hollow fibre membrane is made with a plurality of reinforcing filaments. The reinforcing filaments can include longitudinally extending filaments, which may be called warp filaments, as well as one or more filaments that extend obliquely between warp filaments, which may be called "wrap" filaments. In one structure, a wrap filament is provided in a continuous spiral around the warp filaments. In another structure, a plurality of discontinuous wrap filament segments collectively extend between each pair of adjacent warp filaments, although individual segments might not extend completely around the reinforcing structure. In another structure, a continuous wrap filament extends along the length of the reinforcing structure and also back and forth between two or more warp filaments.

The reinforcing filaments are not woven or braided together, but the may be bonded together at one or more, or a plurality of, points of contact between them. The bonding may be by way of heat, softening with a solvent or UV-activation. The bonding may occur before a membrane is formed around the reinforcing structure. Alternatively, a reinforcing structure may be bonded while a membrane is formed around the reinforcing structure by way of a solvent in the membrane dope softening the reinforcing filaments or an outer layer of the reinforcing filaments.

A reinforcing filament may be a monofilament or a multifilament such as a yarn. A reinforcing filament may be made of a polymer and have an outer layer of another polymer that better responds to a bonding method. For example, a reinforcing filament may have an outer layer of a polymer that is soluble in a solvent in a membrane forming dope.

A hollow fiber membrane has a reinforcing structure embedded within a membrane wall. The membrane may have an ID/OD ratio of 0.6 or more. The membrane may have an inside diameter in a range of about 0.5 mm to 2.0 mm.

A reinforcing structure may be formed over a needle or wire while advancing a formed portion of the structure along the needle or wire. The formed portion of the reinforcing structure may be advanced directly into a dope coating spinneret before or directly after moving the reinforcing structure past an end of the needle or wire, without first winding the reinforcing structure onto a bobbin or reel. A polymer dope can be injected into the dope coating spinneret such that formation of the reinforcing structure and the membrane occur one after the other at the same speed. One or more filaments may be bonded together as the reinforcing structure is moving along the needle or wire, or in the dope coating spinneret.

BRIEF DESCRIPTION OF THE DRAWINGS

The accompanying drawings, which are incorporated in and constitute a part of the specification, illustrate one or more embodiments and, together with the description, explain these embodiments. In the drawings:

FIGS. 6A and 6B are elevation and bottom plan view, respectively, drawings of an in-situ filament formation device for making discontinuous wrap filaments in accordance with an embodiment of the present invention;

FIG. 7 is a side view of a reinforced hollow fiber membrane with a portion of the membrane wall cut away to show a reinforcing structure with zigzag wrap filaments in accordance with an embodiment of the present invention; and FIG. 8 is a side view of another reinforced hollow fiber membrane with a portion of the membrane wall cut away to show a reinforcing structure with discontinuous wrap filaments in accordance with an embodiment of the present invention.

DETAILED DESCRIPTION OF THE INVENTION

In the description of the different methods of structures below, the longitudinal axis of the hollow fibre is vertical and a reinforcing structure is formed as it moves downwards.

A reinforced hollow fiber is described below with integral reinforcing textile filaments embedded in, preferably buried within, the wall of the hollow fibre. The reinforcing filaments can be monofilaments or multi-filaments, for example a yarn, or a multi-component multi-filament. The reinforcing filaments run i) in the longitudinal or vertical direction, preferably substantially continuously (called warp filaments herein) and ii) along the circumference, in a continuous, zigzag or discontinuous way (called wrap filaments herein). A plurality of zigzag and discontinuous wrap filaments collectively surround the warp filaments although individual zigzag or discontinuous filaments might not travel completely around the circumference of the reinforcing structure. The reinforcing filaments are not woven or braided together but they can, however, be attached or fused to each other at points of contact where they intersect each other.

The filaments form a cage-like reinforcing structure that can be impregnated with a membrane dope in a continuous operation in which the dope impregnation is done shortly after the reinforcing structure is formed, with both a dope impregnation and reinforcing structure formation process operating at the same time and at the same speed.

The reinforced hollow fibre preferably has a thin wall, with a ratio of inside-to-outside diameters larger than 0.60. The inside diameter of the hollow fibre can be between 0.5 to 2 mm, preferably between 0.8 to 1.5 mm.

Figure 1:
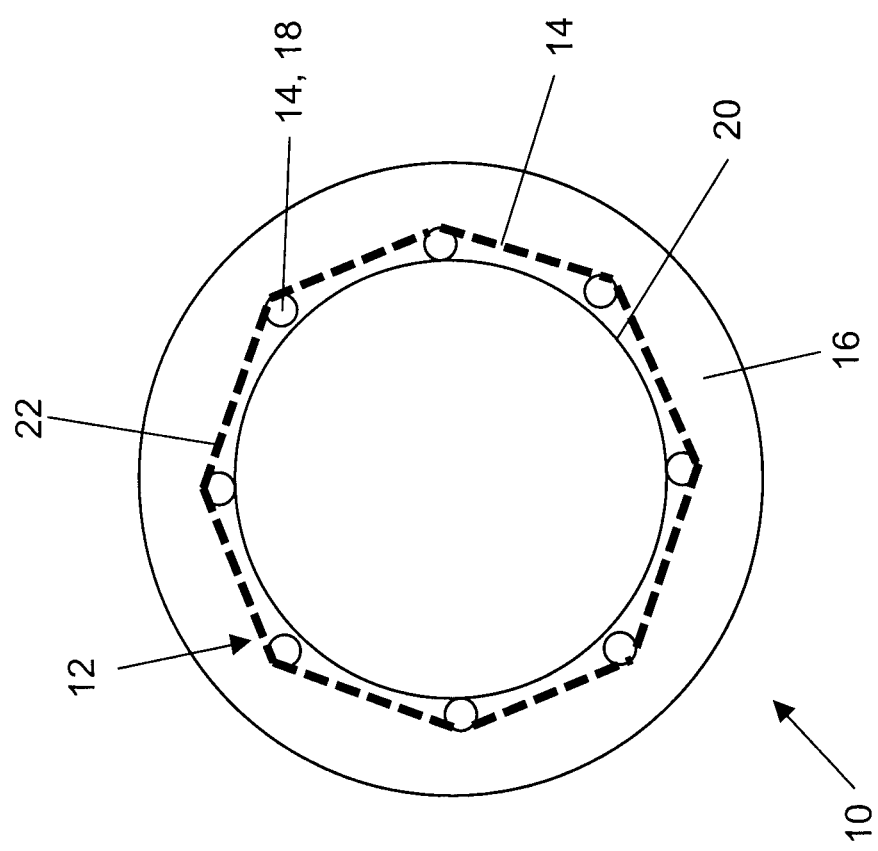
FIG. 1 is a cross section of a hollow fiber membrane showing a reinforcing structure with a single set of wrap filaments in accordance with an embodiment of the present invention.

The cross-section of a reinforced hollow fiber membrane 10 with a reinforcing structure 12 is illustrated in FIG. 1. Two types of textile filaments 14 are embedded in the hollow fibre wall 16. The first type, called "warp" filaments 18, runs longitudinally and continuously along the vertical axis of the hollow fiber membrane 10 near the inside 20 of the wall 16. The number of parallel warp filaments 18 may be such that the sum of their diameters divided by the inside circumference of the hollow fibre 10 is in a range from 0.2 to 0.6, preferably between 0.3 and 0.5. For warp filaments 18 that are a multi-filament yarn, this parameter can be taken as (1−porosity). The second type of filaments, called "wrap" filaments 22 extend from one warp filament 18 to another, preferably within the wall 16 immediately adjacent to and in contact with the warp filaments 18. For example, one or more wrap filaments 22 may extend continuously along the length of a membrane in a spiral around all of the warp filaments 18, or a plurality of wrap filaments 22 may each extend back and forth between at least a sub-set of the warp filaments 18 and along the length of a membrane 10 in a zigzag pattern, or a collection of discontinuous wrap filaments 22 may each extend between two or more warp filaments 18 without any one of them necessarily extending completely along or around the entire membrane 10.

Figure 2:
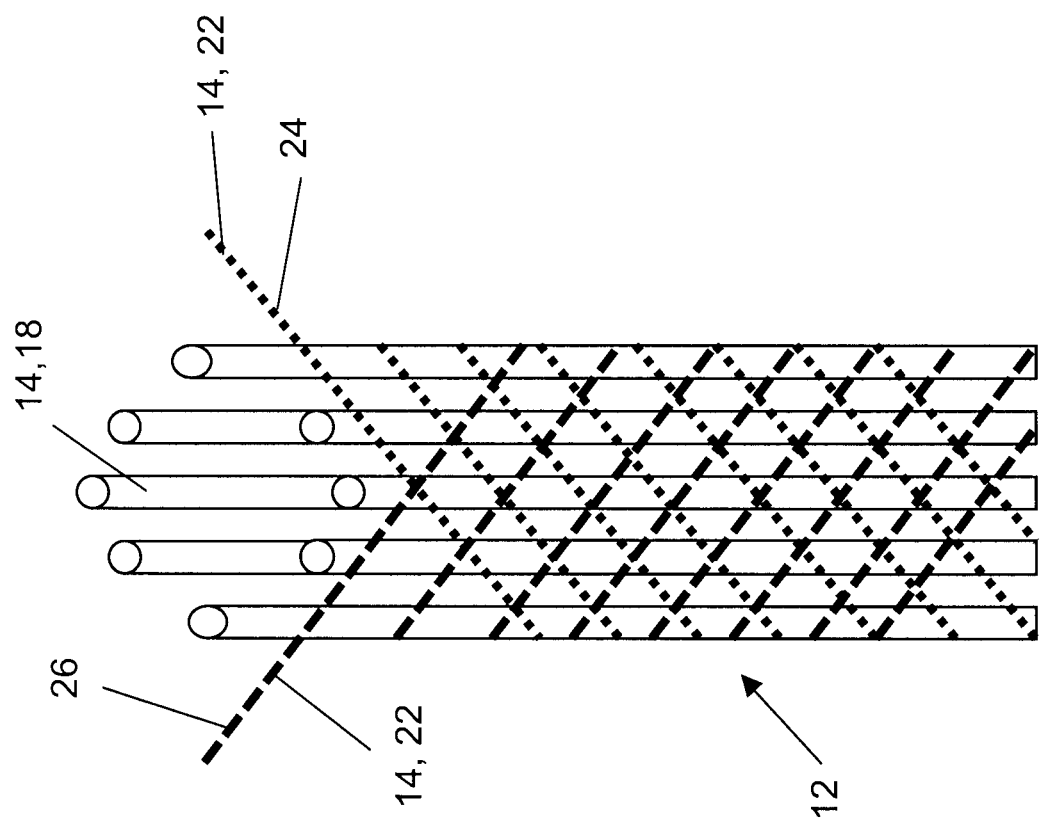
FIG. 2 is a side view a cage-like reinforcing structure with warp filaments and two sets of spiral wrap filaments in accordance with an embodiment of the present invention.

There can be one or more, possibly several, layers of wrap filaments 22. If there is more than one layer, the additional layer(s) are immediately adjacent to and in contact with the first layer. In FIG. 2, for example, a cage-like structure 12 has two layers of wrap filaments 22. The first layer 24 has a continuous wrap filament that was wrapped counter-clockwise (viewed from above) around the warp filaments 18 as the warp filaments 18 moved downwards. The second layer 26 has a continuous wrap filament that was wrapped clockwise (viewed from above) around the first layer 24 as the warp filaments 18 moved downwards. Preferably, the warp 18 and wrap 22 filaments are bonded together at points of contact where they intersect, although it is not necessary for the filaments 18, 22 to be bonded together at every point of contact and, optionally, there may be no bonding.

Warp 18 and wrap 22 filaments can be either mono or multi filaments or a mixture of both. They can be made from polymers such as polyethylene, polypropylene, polyester, nylon, aramid, etc. Filaments 14 can be coated with a thin, for example less than 10 μm, polymer layer which allows filament to filament bonding where they intersect. Bonding can be achieved by a number of methods known in the art including, without limitation, heating, softening with a solvent or UV-activation. Bonding can be better controlled by coating the filaments 22 with a layer that responds to the bonding method. In the case where a filament 14 is a multi-filament, only one or a few of the individual filaments might be involved in a bond with an intersecting filament 14.

Fabrication methods can be based on pre-formed wrap filaments 22 as will be described with reference to FIG. 3. Pre-formed wrap filaments 22 are un-wound from bobbins and wrapped around the warp filaments 18 in a continuous way. The wrapping pitch is defined as the distance between two points along the axis of the hollow fibre where a continuous wrap filament 22 comes back to the same circumferential (radial angle) position. It is a function of the distance between filaments 22 and the number of filaments 22. The centre-to-centre distance between continuous wrapping filaments 22 can be between 1-10 times their diameter, preferably between 2 to 5.

Fabrication methods can also be based on filaments 22 produced in-situ by melt-extrusion or dry spinning as will be described with reference to FIGS. 4 to 6. Melt extrusion or dry spinning are herein used as commonly understood in textile yarn production. Filaments formed in-situ offer more options for delivering the wrap filaments 22 as will be described a zigzag pattern example and a chopped fiber example.

Figure 3:
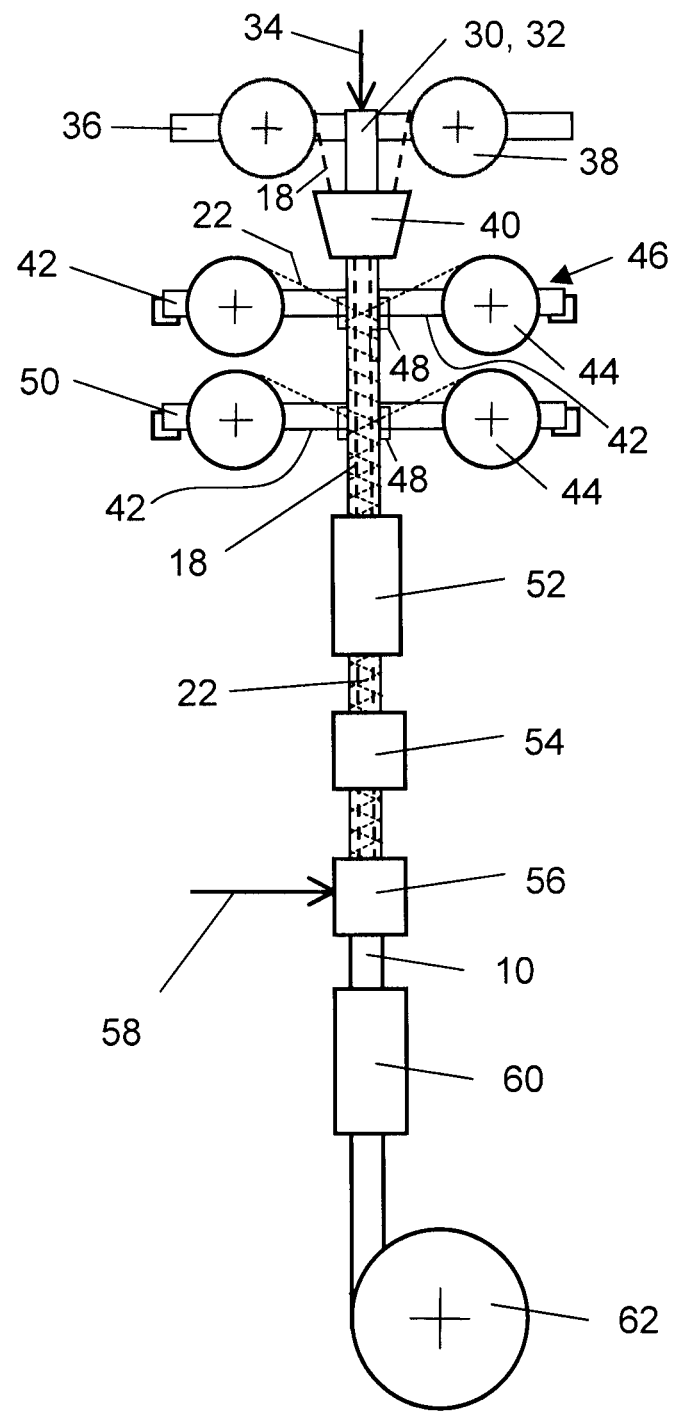
FIG. 3 is a schematic representation, in elevation view, of a machine for making a non-braided reinforced hollow fiber membrane with pre-existing wrap filaments in accordance with an embodiment of the present invention.
Figure 4:
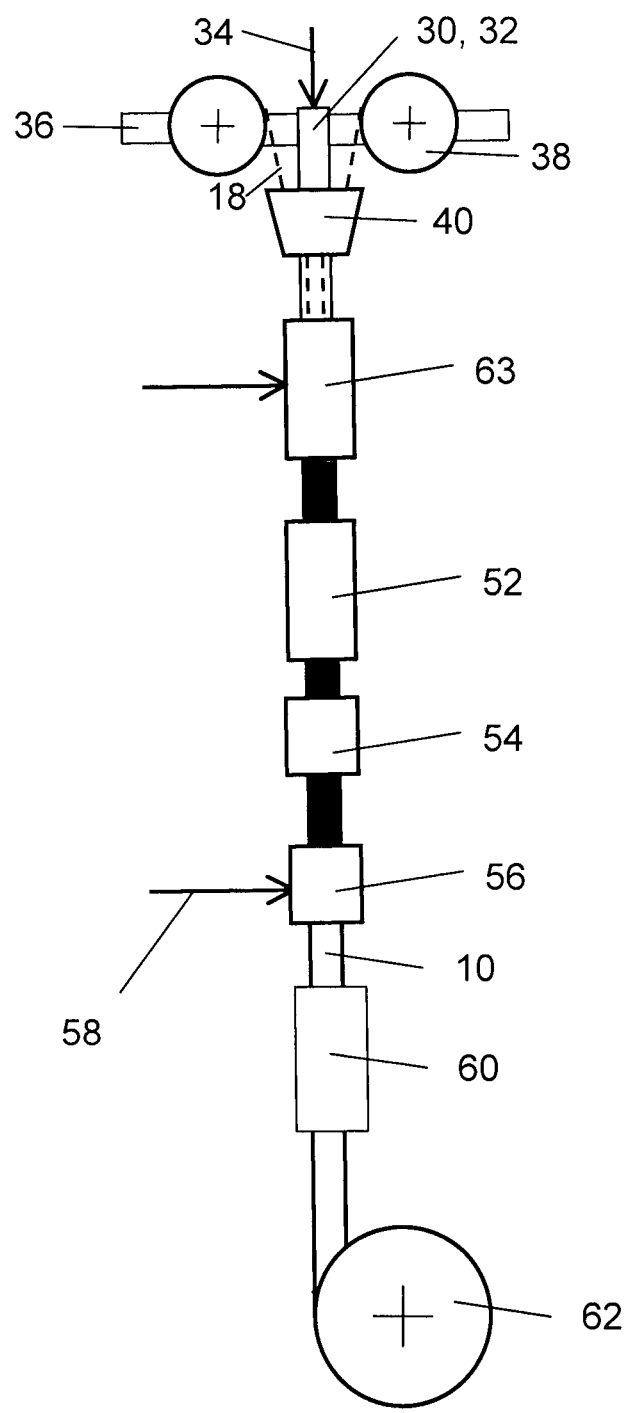
FIG. 4 is a schematic representation, in elevation view, of a machine for making a non-braided reinforced hollow fiber membrane with in-situ filament formation in accordance with an embodiment of the present invention.

In the examples of FIGS. 3 and 4, a reinforced hollow fiber membrane is produced continuously in a machine wherein all the steps are done at the same linear speed called the spinning velocity. The spinning velocity for pre-formed filaments in the example of FIG. 3 may range between 0.5-5 m/min, preferably between 1-3 m/min. The spinning velocity for filaments formed in-situ may range between 5-20 m/min, preferably between 10-15 m/min.

An example of a process and a device to fabricate a non-braided, reinforced hollow fibre membrane 10 is illustrated in FIG. 3. The process is built around a fixed needle 30 of a diameter substantially equal to the desired inside diameter of the hollow fibre membrane 10. The top portion 32 of the needle 30, which is hollow, is open to atmosphere or attached to a source of a pressurized gas 34.

Going down along the needle 30, there is a creel 36 where bobbins 38 are arranged radially (spaced angularly) around the needle 30 to distribute warp filaments 18. The warp bobbins 38 are stationary and there is one bobbin 38 per warp filament 18 with individual tension control. The warp filaments 18 are distributed evenly around the needle 30 through a warp filament die 40. The wrap filament die 40 is the only mechanical attachment point between the needle 30 and the structure of the spinning machine (not shown).

Next going down along the needle 30 is a first creel 42 for wrap filaments 22. The wrap filament bobbins 44 are mounted on a wheel 46 that rotates around the needle 30 without being in contact with it, and always in the same direction, which is clockwise in this example. Each wrap bobbin 44 is equipped with tension control. The wrapping velocity is equal to the spinning velocity divided by the wrapping pitch.

For example, a hollow fiber membrane 10 may have the following parameters:
Hollow fibre ID/OD=1.0/1.3 mm
Diameter of warp filaments=0.1 mm
Number of warp filaments=12
Inside circumference=3.1416 mm
Single wrap layer
Diameter of wrap filaments=0.1 mm
Wrapping angle=45°
Wrapping pitch=1.3 mm (1.0+2×0.1+0.1)
Number wrap filaments=4
Wrap filament c/c distance=1.3/4=0.325 mm Using the wrapping pitch of 1.3 mm and a spinning velocity of 2 m/min, the wrapping velocity is 2000/1.3=1538 rpm. The wrap filaments 22 are distributed along the axis of the needle through a wrap die 48 which ensures a precise center to center distance between wrap filaments 22.

Going down along the needle 30, there is an optional second creel 50 for wrap filaments 22. The second wrap filament creel 50 is similar to the first filament creel 42, except that it rotates in the opposite direction, counter-clockwise in this example, and can have a different number of filaments 22.

Going down, there is an optional filament bonding device 52. Depending on the nature of the coating on the filaments 14, bonding at least some of the points of contact can be achieved by heating, applying UV, etc. Alternatively, this step can be performed during application of the membrane dope if the dope solvent has the ability to soften the filament polymer or coating and promote bonding.

Going down along the needle 30, there is an optional temperature adjustment device 54, cooling or heating, before entering the dope coating spinneret 56.

The membrane impregnation step is done with a spinneret 56 used to inject the polymer dope 58 to fill the gap between the needle 30 and the spinneret 56 lumen diameter. The diameter of the needle 30 can be reduced in the area of the spinneret 56 to ensure that the polymer dope 58 fully impregnates the filament reinforcing structure 12 and that no filament 14 is exposed to the hollow fibre lumen. Because the needle 30 acts to restrict dope flow into the lumen of the hollow fiber membrane 10, a relatively simple dope delivery method based on pressure control can be used (as opposed to flow control as described in other processes later).

The needle 30 ends just as the formed reinforced hollow fibre 10 exits the spinneret. A gas drawn through the needle bore prevents fibre collapse.

The following steps performed in a post-treatment area 60 are similar to those used to make un-reinforced or braid coated hollow fibres and they vary according to the polymer coagulation method (NIPS or TIPS), and the desired membrane properties. These conditions are known in the art and typically include the steps of initial membrane formation through an air gap, coagulation, rinsing, post-treatment (e.g., chlorination), impregnation (e.g., with glycerine), bundling and drying. These can all be in-line but they are often interrupted by taking up the hollow fibre onto a bobbin or a winder 62.

The spinning velocity is controlled by the finished hollow fibre take up speed. The wrapping velocity must be precisely coupled to the spinning velocity, either mechanically or electronically.

Another process and a device to fabricate a non-braided, reinforced hollow fibre membrane 10 is illustrated in FIG. 4. This method and device are similar to that of FIG. 3, except that the rotating creels 42, 50 for wrap filaments 22 are replaced by an in-situ filament formation device 62, which is described below.

In FIG. 4, wrap filaments 22 are produced in-situ by melt-extrusion or dry spinning. In-situ formed filaments 22 are preferably produced by melt-extrusion, which is described in U.S. Pat. No. 3,849,241, U.S. Pat. No. 5,271,883 and U.S. Pat. No. 6,114,017, which are incorporated herein in their entirety. In melt extrusion, thermoplastic polymers are extruded at high temperature through small orifices using air to elongate the filaments and transport them to a moving collector. In this case, the warp filaments 18 moving down function as the moving collector. Typical process conditions for the spunbond and meltblown processes are described in the following Table 1. Polymer flow per hole can be up to 1-2 g/min.

TABLE 1

| Process | Filament diameter μm | Elongation Factor | Die Hole Diameter μm |
|---|---|---|---|
| Spunbond | 20-80 | 20-40 | 1000-2000 |
| Meltblown | 2-6 | 100-200 | 400-1000 |

A first in-situ filament formation device 63A is described with reference to FIGS. 5A and 5B. Extrusion die assemblies 70 are located around the needle 30 along which travels the warp filaments 18. Each extrusion die assembly 70 has a molten (for melt spinning) or dissolved (for dry spinning) port 72 and extrusion holes 74, as well as high pressure air port 76 and air jet holes 78 located around the polymer extrusion hole 74. Given to turbulent nature of the air flow around the die 70, the filaments 22 deposit randomly on the surface of the warp fibres 18. Air flow can be pulsed to improve wrap filament 22 distribution.

As an alternative, each extrusion die assembly 70 may be mounted in a way that allows rapid vibration in the horizontal plane. Vibration at a frequency of 50 to 200 Hertz can be effected by a number of means known in the art. In FIGS. 5A and 5B, the extrusion die 70 is mounted on a vertical rod 80 that acts as a spring; a small motor with an ex-centered mass 84 on its shaft is mounted on the die assembly 70 and its rotation puts the entire die assembly 70 in vibration, as taught by Culkin in U.S. Pat. No. 5,014,564, which is incorporated herein in its entirety.

Given the conditions above, it can be calculated that a typical elongated filament of 50 μm extruded at a polymer flow rate of 2 g/min would come out at a velocity of about 16 m/s. This velocity is 2 orders of magnitude larger than the spinning velocity, which means that the wrap filaments are deposited on the downwards travelling warp filaments 18 at a small negative (upwards in the direction of motion of the die assembly 70) angle to the horizontal.

Figure 5B:
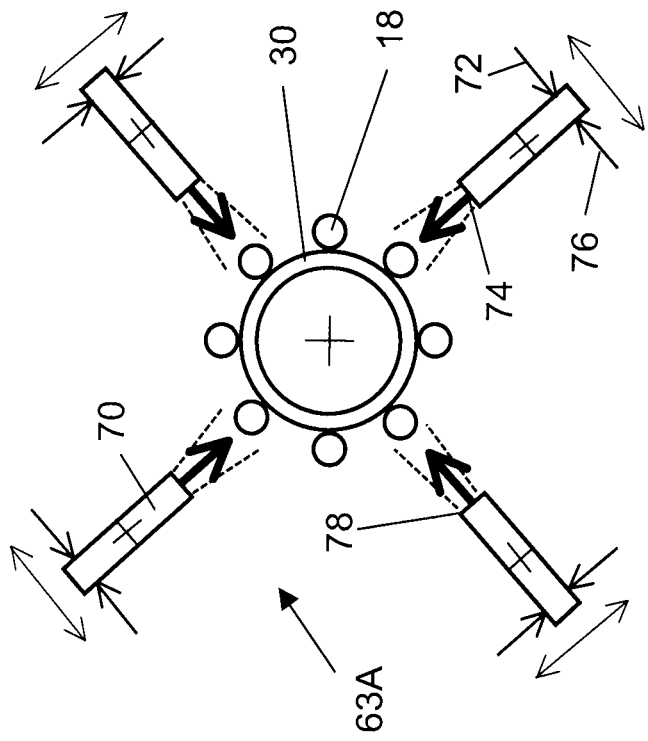
FIGS. 5A and 5B are elevation and plan view, respectively, drawings of an in-situ filament formation device for making zigzag wrap filaments in accordance with an embodiment of the present invention.
Figure 5A:
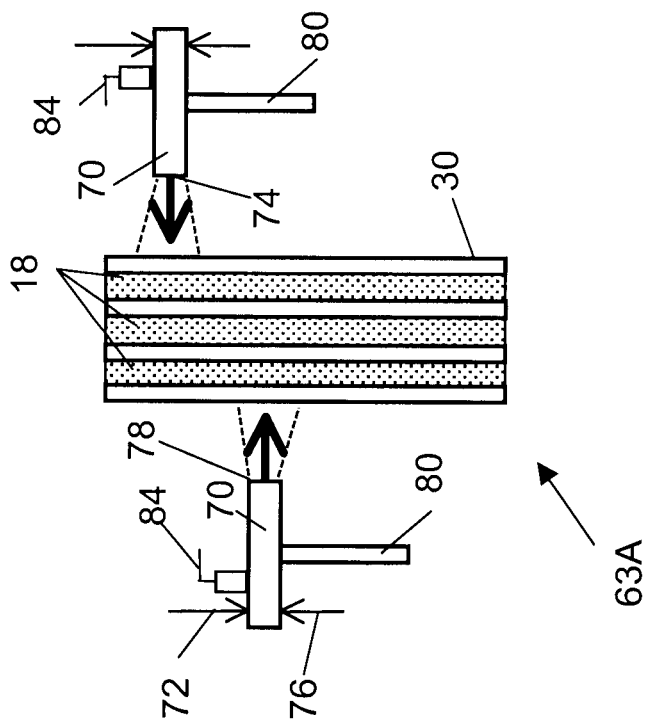

FIG. 5B shows 4 extrusion die assemblies but the number can vary from 3 to 9, preferably 4 to 8 to ensure overlap of wrap filaments 22 around the perimeter of the reinforcing structure 12. FIG. 5A illustrates that the extrusion die assemblies 70 (only 2 shown in FIG. 5A) are positioned around the needle in different horizontal planes so that the flow of elongation air for one extrusion die 70 does not interfere with the others.

The resulting structure of wrap filaments is a series of continuous overlapping zigzag wrap filaments 22. Each wrap filament 22 travels back and forth between two or more warp filaments 18. A single wrap filament 22 might extend around only a portion of the circumference of the reinforcing structure 12, but the wrap filaments 22 collectively surround the warp filaments. For example, in FIG. 7 four wrap filaments 22, of which only two at the front of the membrane 10 are shown, each extend back and forth between a set of three warp filaments 18 but collectively the wrap filaments 22 extend between all eight of the warp filaments 18 in the membrane 10.

For further example, a membrane 10 may be made according to the following parameters:
Wrap filaments occupying space in membrane wall between diameter 1.2 and 1.3 mm
50% porosity
Polymer density=1 g/ml
Mass of wrap filaments per m of hollow fibre=0.098 g/m
Assuming spinning velocity of 15 m/min
Mass flow rate of wrap filament=0.098×15=1.47 g/min
With four extrusion dies, mass flow rate per die=0.37 g/min Another process and a device to fabricate a non-braided, reinforced hollow fibre membrane 10 according to the general description of FIG. 4 uses fixed dies and rotating air knives as shown in FIGS. 6A and 6B for an in-situ filament forming device 63B.

A ring-shaped extrusion die assembly 90 is located around the needle 30 along which travels the warp filaments 18. The die assembly 90 has a polymer port 92 and several, for example 4 to 8, extrusion holes 94 surrounded by air ports 95. Immediately above or below, there is an air knife assembly 96, which has a fixed part 98 and a rotating part 100. The rotating part 100 has one or more air knives 102 that cut the filaments 22 as it rotates around the needle. The rotation speed of the air knife 102 is matched to the extrusion speed to control the length of the filaments 22. The air knife 102 also changes the travelling direction of the cut filaments to cause them to deposit on the warps 18 surface along the circumference, at a negative angle to horizontal.

The resulting structure of wrap filaments 22 is a series of chopped filaments (segments) 22 deposited on the warp filaments 18 at a small angle to horizontal. As shown in FIG. 8, for example, each wrap filament 22 might not extend along the entire length or circumference of the membrane 10, but the warp filaments 22 collectively extend between all of the warp filaments 18.

The steps described above for forming a reinforcing structure before membrane impregnation, may result in a self-supporting, cylindrical structure that is strong and has a thin wall. In some cases it may be desirable to apply the membrane dope below the end of the needle 30 so that there is a gap between the end of the needle 30 and the impregnation spinneret 56. In this case, the needle 30 can be replaced by a simple wire as pressure equilibration can be effected in the gap, where ambient air is sucked into the lumen of the forming hollow fiber membrane 10 to prevent collapse.

In this case, the subsequent membrane impregnation step must be done by delivering the dope at a precise flow rate to avoid filling the lumen of the membrane 10, which is now open (not filled by the needle 30 or wire). A positive displacement pump can be used for that purpose. This operation can be made easier if the membrane dope spontaneously wets the reinforcing filaments 14 so that it is retained by surface tension within the cage structure 12. This can be achieved by treating the surface of the filaments 14 and/or manipulating the composition of the dope.

The steps described above, before membrane impregnation, can be interrupted and the cage-like self-supporting tube 12 can be taken up on a bobbin for further processing. In this case, the subsequent membrane impregnation step must also be done by delivering the dope at a precise flow rate as described in the paragraph above.

I claim:

1. A generally tube-shaped reinforcing structure for a hollow fibre membrane comprising,
   a) a plurality of reinforcing filaments comprising,
      i) a plurality of warp filaments, the plurality of warp filaments being generally parallel to each other and spaced apart from each other circumferentially; and,
      ii) one or more wrap filaments, each of the one or more wrap filaments extending obliquely between at least two of the plurality of warp filaments,
   wherein
      the plurality of reinforcing filaments are bonded together at one or more points of contact where they intersect.

2. The reinforcing structure of claim 1 wherein the reinforcing filaments do not cross each other radially.

3. The reinforcing structure of claim 1 wherein the one or more wrap filaments are located radially outside of the plurality of warp filaments.

4. The reinforcing structure of claim 1 wherein the one or more wrap filaments comprise a filament wrapped in a continuous spiral around the outside of the one or more warp filaments.

5. The reinforcing structure of claim 1 wherein the one or more wrap filaments comprise a plurality of filament segments.

6. The reinforcing structure of claim 1 wherein the one or more wrap filaments comprise a plurality of filaments that extend along the length of the reinforcing structure in a zigzag pattern.

7. The reinforcing structure of claim 1 wherein one or more of the reinforcing filaments has an outer layer that responds to bonding by at least one of heating, softening with a solvent and UV activation.

8. The reinforcing structure of claim 1 wherein the reinforcing filaments are bonded together by softening of the reinforcing filaments or an outer layer of the reinforcing filaments in a solvent of a membrane dope applied to the reinforcing structure.

9. A reinforcing structure for a hollow fibre membrane comprising, a plurality of reinforcing filaments, wherein one or more of the reinforcing filaments comprises a first polymer and an outer layer of a second polymer that responds to bonding by at least one of heating, softening with a solvent and UV activation, wherein
    the reinforcing filaments are bonded together at one or more points of contact where they intersect by softening of the reinforcing filaments or an outer layer of the reinforcing filaments in a solvent of a membrane dope applied to the reinforcing structure.

10. The reinforcing structure of claim 9 wherein the reinforcing filaments are not woven together.

11. The reinforcing structure of claim 9 wherein the reinforcing filaments comprise monofilaments, multi-filaments or a mixture of monofilaments and multi-filaments.

12. A hollow fiber membrane comprising a reinforcing structure according to claim 9 embedded within a membrane wall.

* * * * *